Oct. 25, 1960   G. N. CARLISLE   2,957,443
REVERSE MOVEMENT ALARM FOR USE ON VEHICLES
Filed Oct. 16, 1958   2 Sheets-Sheet 1
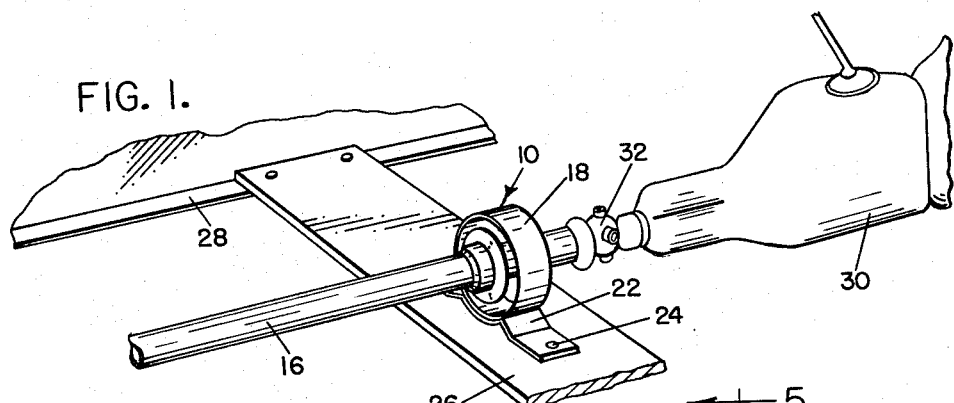
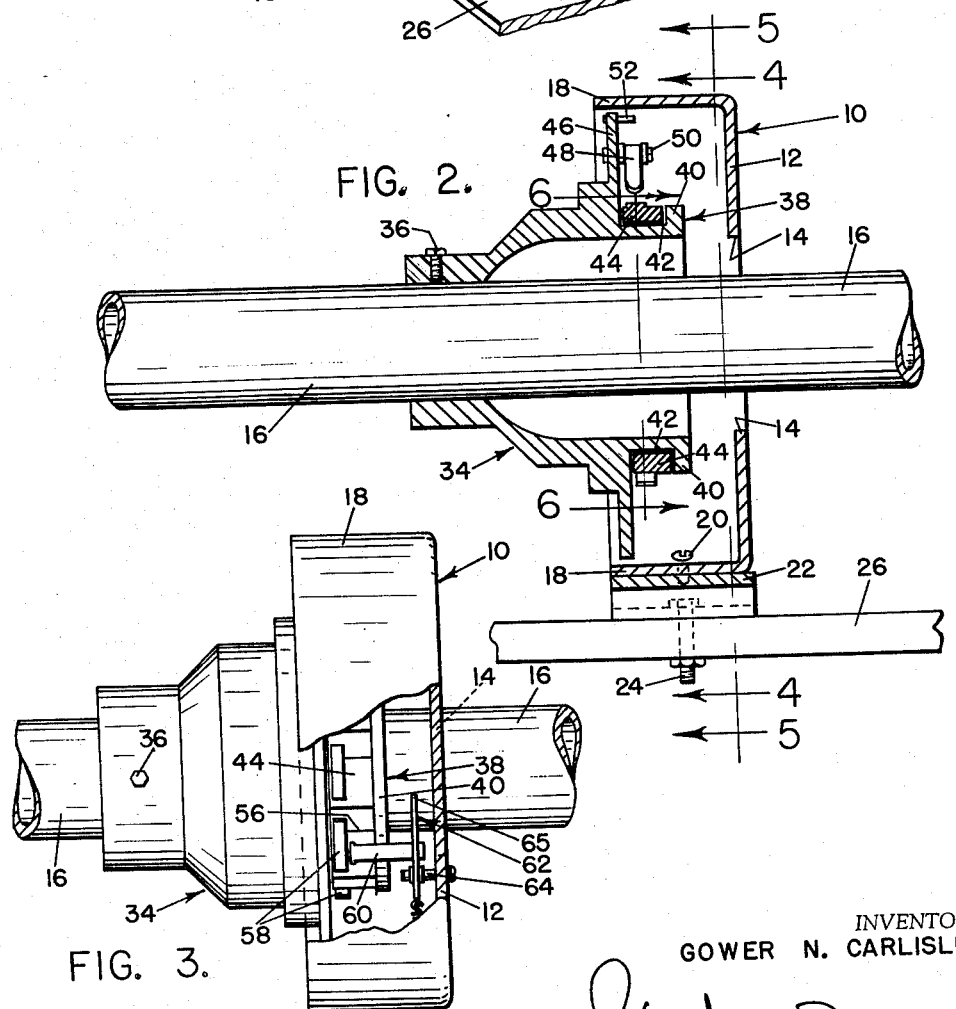
INVENTOR,
GOWER N. CARLISLE.
BY Robert M. Dunning
ATTORNEY Oct. 25, 1960

G. N. CARLISLE 2,957,443

REVERSE MOVEMENT ALARM FOR USE ON VEHICLES

Filed Oct. 16, 1958

INVENTOR,
GOWER N. CARLISLE.

BY *Robert m. Dunning*

ATTORNEY

United States Patent Office 2,957,443
Patented Oct. 25, 1960

2,957,443

REVERSE MOVEMENT ALARM FOR USE ON VEHICLES

Gower N. Carlisle, 2205 W. 1st St., Duluth 6, Minn.

Filed Oct. 16, 1958, Ser. No. 767,658

11 Claims. (Cl. 116—56)

This invention relates to an improvement in vehicle back-up warning signals and deals particularly with an alarm system which is automatically operated when the vehicle is moving in a reverse direction.

In my previously filed application for patent for a back-up warning signal, Serial Number 595,294 filed July 2, 1956, now abandoned, of which the present application is a continuation-in-part, I disclosed an alarm bell system which was very effective, but in the operation and production thereof certain changes have been found desirable. In the first disclosed alarm bell system the arrangement of the clapper and clapper actuating means was such that an excessive and undesirable noise resulted at the time the vehicle was moving in a forward direction, and although the clicking noise did not affect the operation of the alarm bell system, it was nevertheless distracting to the operators of the vehicles and over a long period of time would result in excessive wear of the clapper and its mechanical actuating parts.

It is an object of the present invention to obviate this mechanical deficiency, eliminate the undesirable noise, and incorporate the changes in the present application.

It is well known that many accidents are caused by vehicles traveling in a reverse direction and this is particularly true in conjunction with industrial vehicles such as heavy trucks, earth movers and the like which tend to block the rear view of the operator. Many electrical and mechanical warning signals have been devised for this use; however structures of this type are not particularly effective on large vehicles as oftentimes special connections are required between tractors and trailers or other connected conveyances.

For example, in highway, mining and dam excavating operations, earth movers of tremendous size are often used to move material from one point to another. These vehicles are often so large that it is difficult for the operators to obtain a clear view behind the trailer as it is backed into loading or unloading position. In an environment of this kind there is usually considerable noise and it is difficult for workmen to hear a vehicle being backed into a position. While the present invention is applicable to various uses, it is particularly designed for use in situations of this type.

The purpose of this invention is, therefore, to provide a back-up warning signal which is actuated by the reverse direction of the vehicle drive shaft. The arrangement is such that each time the drive shaft rotates in a reverse direction a bell or gong is sounded one or more times to provide a clear warning for workmen in the immediate area who might be in the path of the reversely moving vehicle.

An object of the present invention resides in the simplicity of construction and the compactness of installation of the alarm system. The alarm bell may be of the circular type illustrated in the drawings or may be a flat sheet of metal suspended in the path of the clapper and capable of giving off a ringing sound. The clapper comprises a pivoted lever which is normally held with its striking end out of engagement with the alarm bell or gong. A hub is rotatably mounted on the drive shaft and is provided with ratchet dog means which engage a ratchet ring also rotatably mounted on the hub. As the drive shaft is rotated in a reverse direction, the ratchet dogs engage the ratchet ring rotating it in a reverse direction. A lug projecting from the ratchet ring will operatively pivot the clapper once for every reverse revolution of the drive shaft. Momentum will cause the striking end of the clapper to strike the alarm bell or gong. Immediately thereafter the spring attached to the clapper returns the clapper to its intermediate inoperative position until the clapper is again engaged by the projecting lug on the ratchet ring on the next revolution of the drive shaft. A modification includes spring means pivotally mounted adjacent the clapper which will return the clapper to an inoperative position in which its striking end is in engagement with the alarm bell or gong.

Another object of this invention is to provide a ratchet ring which is rotatably mounted on a hub and engageable with ratchet dogs mounted on the hub. As the drive shaft and hub are rotated in a reverse direction one or more of the ratchet dogs mounted on the hub will engage the ratchet ring, rotating it in a reverse direction. Accordingly as the drive shaft rotates forwardly the ratchet dogs are disengaged from the ratchet ring. The ratchet dog means are pivotally mounted on the hub and are so constructed as to drop by gravity into engagement with the ratchet ring as the drive shaft is reversed. Upon forward rotation of the drive shaft the ratchet dogs are held out of engagement with the ratchet ring by centrifugal force resulting in a comparatively noiseless operation when the vehicle is progressing forwardly.

A further object of this invention is the provision of an alarm bell signal system, the actuating means of which may be readily applied to the drive shaft of a vehicle, the remainder of the construction may be supported by suitable brackets attached to the frame of the vehicle.

Other features and advantages of the invention will appear from the following description taken in connection with the drawings where:

Figure 1 is a perspective view showing a portion of a vehicle and showing the alarm attached thereto.

Figure 2 is a vertical sectional view taken through the intermediate portion of the alarm on the line 2—2 of Figure 3.

Figure 3 is a side elevational view of the device as illustrated in Figure 2 showing a portion of the alarm bell housing broken away.

Figure 4:
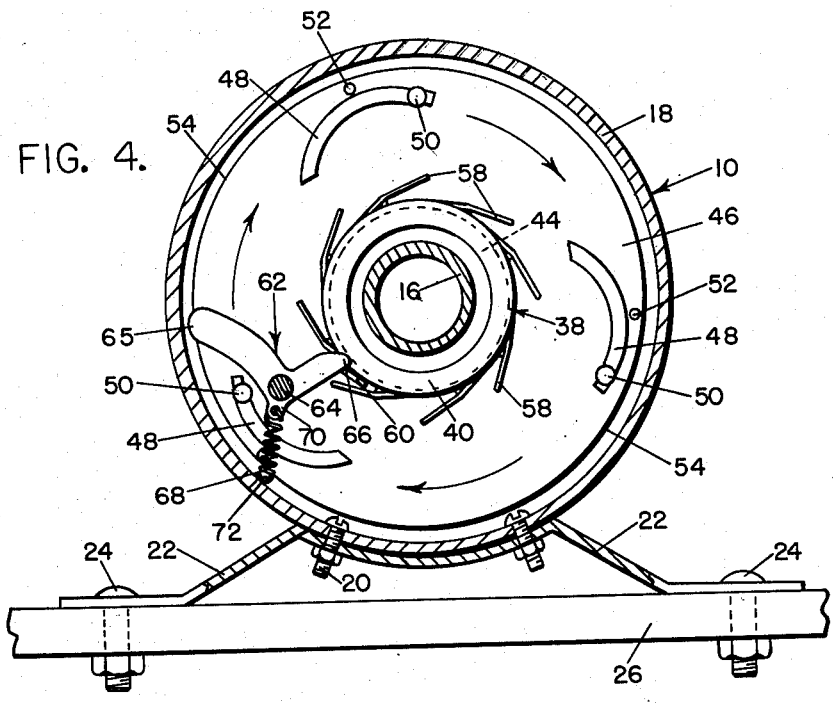
Figure 4 is an enlarged vertical sectional view taken substantially on line 4—4 of Figure 2 showing ratchet dog means positioned out of engagement with the ratchet ring and showing one form of spring means employed for normally holding the clapper lever out of engagement with the alarm bell housing.

While one embodiment of the invention is illustrated in the above-referred to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention, it remains obvious that it may be employed in any other capacity wherein it may be found applicable.

Certain parts of the structure illustrated are shown diagrammatically for purposes of clarification. For example, the figures illustrate an alarm bell which is cylindrical and which is circumposed about the drive shaft. In actual practice it may be more convenient to provide a plate or sheet of metal which is mounted adjacent the drive shaft having clapper means mounted on the plate and in the path of the clapper actuating means employed. Also it may be more practical in actual application to invert the braces shown attached to a frame and to the bell housing thereby suspending the alarm bell housing from an area overlying the drive shaft.

The alarm bell housing is generally referred to by the numeral 10 and includes a disc portion 12 which is axially bored at 14 to accommodate the drive shaft 16. A cylindrical flange 18 extends at a right angle from the disc 12 and is held by bolts 20 to a bracket 22. The bracket 22 in turn is secured by bolts 24 to a suitable support 26 extended from the frame 28. The vehicle drive shaft 16 is connected to a transmission 30 through proper universal joints 32.

As best shown in Figure 2 the alarm further comprises a hub generally indicated at 34 which is circumposed about the shaft 16 and is rigidly secured to the said shaft by a threaded set screw 36. The opposite end 38 of the hub 34 is provided with a cylindrical flange portion 40 and with a recessed race 42 designed to accommodate a ratchet ring 44. The hub further includes a radially extending disc portion 46 formed integrally therefrom and adapted to rotate freely within the flange 18 of the alarm bell housing 10. The disc portion 46 is shaped to accommodate a plurality of ratchet dogs 48 which are pivotally mounted on fixed pins 50 extended from the disc 46. Stop pins 52 are attached to the disc 46 adjacent the peripheral edge 54 of the disc so as to engage the ratchet dogs 48 and thereby prevent them from pivoting beyond the peripheral edge 54 of the disc 46 when the shaft is rotated in a forward or clockwise direction as is shown in Figure 4.

The ratchet ring is provided with notches 56 and tabs 58 for engagement with the ratchet dogs 48. A projecting lug 60 is secured by welding or the like to the ratchet ring and extends at a right angle from the said ring for purposes later to be described. As indicated in Figure 3 a clapper lever 62 is pivotally mounted on a fixed pin 64 and is supported in spaced relation from the disc 12. As is more clearly indicated in Figures 4 and 5, the clapper lever 62 comprises a bell crank, or is substantially L shaped having a striking end 65 and an end 66 which is engageable with the projecting lug 60.

The ratchet ring and the ratchet dogs on the hub disc thus provide, in effect, a one way clutch including cooperable means on the hub and ring which act to drive the ring in one direction. The clutch is arranged to drive the ring when the vehicle moves rearwardly.

As indicated in Figure 4, the clapper lever 62 is normally held out of engagement with the flange 18 by a spring 68 having one end secured to an ear 70 formed integrally with the clapper lever 62, the other end being attached to an eye 72 formed in the inner side of the flange 18.

Figure 5:
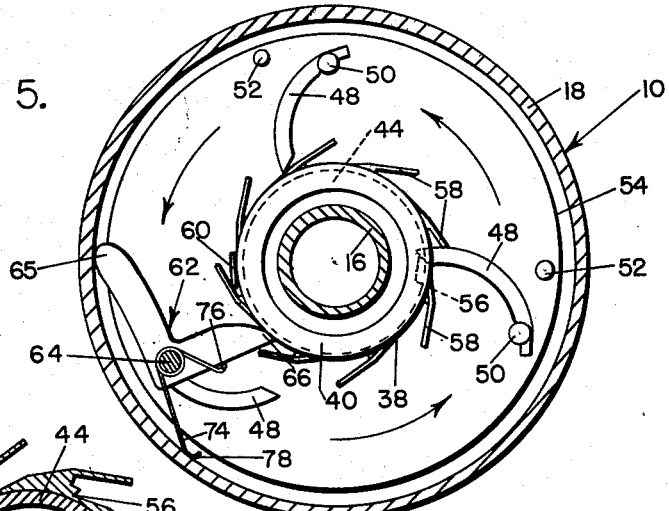
Figure 5 is an enlarged vertical sectional taken substantially on line 5—5 of Figure 2 showing the ratchet ring engaged by the ratchet dogs in an operating position and showing a modified form of spring means employed for holding the clapper lever in an inoperative position having its striking end engaging the alarm bell housing.
Figure 6:
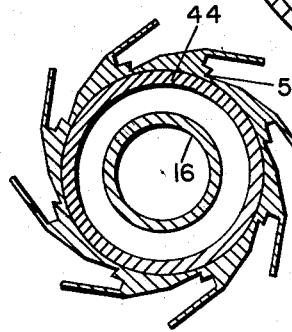
Figure 6 is a sectional view on a plane indicated by the line 6—6 of Figure 2.

A modification of the clapper lever control means illustrated in Figure 5 comprises a torsion spring 74 which is mounted on the fixed pin 64 having one end hooked under the clapper lever end 66 as indicated at 76 and the opposite end 78 abutting the inner wall of the flange 18. This arrangement will result in the striking end 65 of the clapper lever 62 being normally held against the inner surface of the flange 18.

Assuming that the vehicle is in forward motion with the drive shaft 16 rotating in a clockwise direction as indicated in Figure 4, the hub is rotated in the same direction, causing the ratchet dogs 48 to be forced by centrifugal force outwardly against the stop pins 52 as the drive shaft is accelerated. At the same time the ratchet ring is free floating or in neutral position with the projecting lug 60 abutting the under side of the clapper lever 62 causing the ratchet ring to remain substantially in one position. As the drive shaft 16 is stopped preparatory to reversing the direction of the vehicle and the drive shaft, one or more of the ratchet dogs 48 will, by gravity drop into engagement with the ratchet ring. As the drive shaft 16 and fixed hub rotate in a reverse direction as is indicated in Figure 5, the ratchet ring will rotate in the same direction or counter-clockwise. The lug 60 projecting from the ratchet ring will strike the tapered end 66 of the clapper. As the lug 60 passes over the end 66 of the clapped the reverse pivoting momentum will cause the end 65 to strike the flange 18 ringing the bell. If the spring means 68 illustrated in Figure 5 is employed, the clapper lever will return to a position having the striking end 65 out of engagement with the flange 18.

If the spring means 74 is employed in conjunction with the clapper the striking end 65 will remain in contact with the flange 18 after each engagement by the projecting lug 60. In both instances the end 66 projects into the orbit of the lug 60 as it revolves in a reverse or counter-clockwise direction.

In accordance with the patent statutes I have described the principles of construction and operation of my vehicle back-up signal, and while I have endeavored to set forth the best embodiment thereof, I desire to have it understood that obvious changes may be made in the course of manufacture such as fall within the purview of the appended claims without in any manner departing from the spirit and intention of my invention.

I claim:

1. In combination a vehicle having a frame, an engine, a drive shaft rotatably supported on said frame, means connecting the said engine to said shaft for selectively rotating said shaft one direction when said vehicle moves forwardly and in a reverse direction when said vehicle moves rearwardly, an alarm bell supported on said frame circumposed about said shaft, a hub rotatable with said shaft, a ratchet ring rotatably supported on said hub, clapper means mounted on said alarm bell housing, ratchet dog means pivotally mounted on said hub engageable with said ratchet ring, a lug member mounted on said ratchet ring and engageable with said clapper means upon rotation of said shaft, said hub, and said ratchet ring in a reverse direction.

2. The structure of claim 1 and in which said hub is provided with a radially extending disc having said ratchet dog means pivotally mounted thereon for engagement with said ratchet ring whereby said ratchet ring will rotate in a reverse direction when said shaft is rotated in a reverse direction.

3. The structure of claim 1 and in which the said ratchet ring is provided with notches disposed into the peripheral outside surface thereof and engageable with said ratchet dog means when said shaft is rotated in a reverse direction.

4. The structure of claim 1 and in which said ratchet ring is provided with tabs extending therefrom in a substantially tangential direction from said ratchet ring for engagement with said ratchet dogs and to retain said dogs in engagement with said ratchet ring.

5. The structure of claim 1 and in which said clapper means is normally held out of engagement with said alarm bell housing by a spring secured to said clapper means and to said alarm bell housing.

6. A reverse movement alarm for use on a vehicle, the vehicle, including a frame, a drive shaft rotatably supported by said frame, means for selectively driving said shaft in one direction when said vehicle moves forwardly and rotating said shaft in a reverse direction when said vehicle moves rearwardly, an alarm bell housing supported by said frame adjacent said shaft, clapper means supported on a pivot fixed relative to said frame, a hub on said shaft, a ratchet ring rotatably mounted on said hub, ratchet dogs pivotally mounted on said hub for engaging said ratchet ring and rotating said ratchet ring in a reverse direction, said forward rotation of said shaft, hub, and ratchet ring disengaging said ratchet dogs from said ratchet ring, a projecting lug member on said ratchet ring engageable with said clapper means upon movement of said ratchet ring with said shaft in a reverse direction to pivot said clapper, resilient means attached to said clapper means and to said alarm bell housing, said resilient means normally holding said clapper means out of engagement with said alarm bell housing.

7. The structure of claim 6 and in which said alarm bell housing comprises a disc having a peripheral flange extended at a right angle therefrom, said disc having an axial bore therethrough slightly larger than the diameter of the said shaft and in which said clapper means is supported on a fixed pivot on said disc portion, said clapper means spaced therefrom a sufficient distance to be engaged by said projecting lug fixed to said ratchet ring.

8. The structure of claim 6 and in which the said clapper means includes a substantially L shaped member supported on a fixed pivot extended from said alarm bell housing and having right angularly projecting arms one of which is engageable with said alarm bell housing, the remaining said projecting arm being engageable with said projecting lug fixed to said ratchet ring.

9. A reverse movement alarm for use on a vehicle, the vehicle including a frame, a drive shaft rotatably supported by said frame, and including means for selectively driving said shaft in one direction when said vehicle moves forwardly and in a reverse direction when said vehicle moves rearwardly, a ratchet ring rotatably supported on said shaft, an alarm bell supported on said frame adjacent said shaft, a clapper supported on a pivot fixed relative to said frame and pivotal into and out of engagement with said clapper upon movement of said ratchet ring with said shaft in a reverse direction to pivot said clapper, and pivotally mounted ratchet dog means mounted for rotation with said shaft and engageable with said ratchet ring in one pivotal position thereof when said shaft is rotated in a reverse direction, rotation of said shaft in a forward direction freeing said ratchet dogs from said ratchet ring whereby ratchet ring will not rotate and operatively engage said clapper.

10. The structure of claim 9 and in which centrifugal force holds said ratchet dogs out of engagement with said ratchet ring when said vehicle is in forward motion and in which said ratchet holds said ratchet dogs into engagement with itself when said vehicle is moved rearwards.

11. In combination, a vehicle having a frame, a drive shaft which is rotatably supported by said frame, drive means connected to said shaft selectively driving said shaft in one direction when said vehicle moves forwardly and in a reverse direction when said vehicle moves rearwardly, an alarm bell supported on said frame, clapper means pivotally supported for engagement with said bell housing, a fixed pivot supporting said clapper means, a hub secured to said shaft and rotatable therewith, ring means supported encircling said shaft adjacent to said hub and rotatably supported relative to said hub, means on said ring means engageable with said clapper means to actuate said clapper means upon rotation of said ring means, and a one way clutch including cooperable means on said hub and on said ring means engageable to rotate said ring means upon rotation of said hub in a reverse direction only.

References Cited in the file of this patent
UNITED STATES PATENTS

| | | |
|---|---|---|
| 1,215,209 | Simpson | Feb. 6, 1917 |
| 2,761,126 | Morsching | Aug. 28, 1956 |

FOREIGN PATENTS

| | | |
|---|---|---|
| 15,225 | Great Britain | July 2, 1907 |